Oct. 27, 1959  H. S. PREISER ET AL  2,910,419
ENERGIZED ANODE HOLDER ASSEMBLY
Filed Dec. 28, 1956  10 Sheets-Sheet 1

INVENTORS
HERMAN S. PREISER
FRANK E. COOK
BORIS H. TYTELL

BY George Sipkin
B. L. Zangwill
ATTORNEYS

Oct. 27, 1959

H. S. PREISER ET AL 2,910,419

ENERGIZED ANODE HOLDER ASSEMBLY

Filed Dec. 28, 1956

INVENTORS
HERMAN S. PREISER
FRANK E. COOK
BORIS H. TYTELL

BY George Sipkin
B. L. Zangwill
ATTORNEYS

Oct. 27, 1959 H. S. PREISER ET AL 2,910,419
ENERGIZED ANODE HOLDER ASSEMBLY
Filed Dec. 28, 1956 10 Sheets-Sheet 5

INVENTORS
HERMAN S. PREISER
FRANK E. COOK
BORIS H. TYTELL
ATTORNEYS

Oct. 27, 1959

H. S. PREISER ET AL

2,910,419

ENERGIZED ANODE HOLDER ASSEMBLY

Filed Dec. 28, 1956

INVENTORS
HERMAN S. PREISER
FRANK E. COOK
BORIS H. TYTELL

BY

ATTORNEYS

United States Patent Office 2,910,419
Patented Oct. 27, 1959

2,910,419

ENERGIZED ANODE HOLDER ASSEMBLY

Herman S. Preiser, Springfield, and Frank E. Cook, Arlington, Va., and Boris H. Tytell, Mattapan, Mass.

Application December 28, 1956, Serial No. 631,377

3 Claims. (Cl. 204—196)

(Granted under Title 35, U.S. Code (1952), sec. 266)

The invention described herein may be manufactured and used by or for the Government of the United States for governmental purposes without the payment of any royalties thereon or therefor.

This invention relates to cathodic protection of metals against corrosion, and more particularly to cathodic protection of the underwater hull of a surface vessel, submarine or the like against corrosion.

Cathodic protection techniques for corrosion control of marine structures are gradually finding widespread acceptance in marine and naval fields. Briefly stated, cathodic protection is the use of an impressed direct current for reducing or suppressing electrochemical corrosion of a metallic structure immersed in an electrolyte by making the structure a cathode for the impressed current. The impressed current may be supplied by sacrificial galvanic anodes or by electrically energized anodes. This invention is primarily concerned with the latter system employing inert anode materials.

Before describing the instant invention in detail it might be well to examine the factors responsible for the corrosion of the underwater hull of a ship, for example, and learn just how cathodic protection can help in preventing this nuisance.

Bare hull steel immersed in sea water corrodes at the average of 5 mils per year. This fact applies to most carbon steels anywhere in the world. If the corrosion of the steel were distributed uniformly over the metal surface, the problem would be of little consequence. Unfortunately, this is not the case. Most steels have a natural tendency to pit. This results in concentrated localized attack of five to ten times the severity of the average corrosion rate and is a problem of major concern.

Since ship hulls are generally painted, imperfections in the coating such as holidays, porosity and the physical breakdown of paint itself expose bare areas which are susceptible to pitting. Pitting is basically an electrochemical effect where the solution of small localized anodic areas is encouraged when certain conditions exist in sea water or at the exposed surface of the metal. For example, the pitting observed on mild steel is partially the result of heterogeneity of the steel. Relatively minor differences in chemistry, cold work, heat treatment, nonmetallic inclusions, and the like produce many localized and susceptible anodic areas. Velocity effects, varying oxygen content of sea water, galvanic couples of dissimilar metals and the presence of mill scale contribute further to the pitting of the metal. These types of electrochemical attack can be countered by the combined use of cathodic protection and effective paints.

Cathodic protection may be visualized as a reversed galvanic cell, where sufficient current supplied from an external source (auxiliary anode) is impressed on a metallic structure (cathode) to raise the potential of the system cathodes to that of the system anodes (polarization). The nullification of the potential differences between the anodes and cathodes in the system will prevent the flow of self-generating corrosion producing currents within the structure. In other words, if more current is caused to flow into a corroding area than has a tendency to leave, for all practical purposes electrochemical corrosion will cease.

Fortunately, there is a simple method of determining whether or not a metal structure is corroding or is being protected. Every metal has a freely corroding galvanic voltage which is called its half-cell potential. A list of half-cell potentials in sea water has been compiled by arranging metals in their decreasing order of activity. Table I is a galvanic series of commonly used metals and lists magnesium (anodic) at the top and nickel (cathodic) at the bottom. It is general knowledge that a galvanic cell is the electrical combination of two half-cells immersed in a common electrolyte. The galvanic voltage associated with such a cell is the algebraic difference of two half-cell potentials. The total voltage of the cell can be measured directly by connecting the half-cells in question through an appropriate potentiometer.

TABLE I

*Galvanic series of common metals in sea water*

| Anodic ↑ ↓ Cathodic | Magnesium. Zinc. Aluminum. Cadmium. Iron. Lead. Tin. Nickel (active). Copper. Nickel (passive). |
|---|---|

NOTE.—A particular metal in the series will be anodic to all metals listed below it and cathodic to all metals listed above it.

By knowing the value of any one half-cell, the other can be calculated readily. For cathodic protection work, there are available standard reference electrodes which are merely specially constructed half-cells of known stable values. Two common types are in use: the copper-copper sulphate and silver-silver chloride reference electrodes.

The flow of current to a metal causes its half-cell potential to change. A protective potential is reached when the current flowing polarizes the local cells to equilibrium. This is the established criterion for total cathodic protection; namely, the polarization of local cathodes to the open circuit potential of the local anodes. For steel which normally corrodes at —600 mv., polarizing it to —800 mv. (referred to Ag—AgCl half-cell) will provide almost 100% electrochemical corrosion protection.

The chemical reactions associated with steel under cathodic protection in sea water produces a calcareous deposit on the metal surface which is alkaline in nature. Sea water contains large quantities of Na+, H+, Cl−, OH−, Ca++, and Mg++ ions in addition to a host of others. Since the cathode is negatively charged in a cathodic protection system several possible reactions occur:

(1)

$$H^+ + e^- \rightarrow H^0$$

(2)

$$2H^0 \rightarrow H_2$$

or (3)

$$2H^0 + \tfrac{1}{2}O_2 \rightarrow H_2O$$

Reaction 1 is the plating out of atomic hydrogen on the cathode. Reaction 2 is the conversion of atomic hydrogen to hydrogen gas (overvoltage) which then bubbles from the cathode allowing more hydrogen atoms to plate out. Reaction 3 is the removal of hydrogen by oxygen depolarization; the more common reaction in aerated sea water. The rapid removal of H+ ions from the vicinity of the cathode leaves a concentration of OH− ions. This can be summarized by:

(4) $\quad 2H_2O + 2e^- \rightarrow H_2 + 2OH^-$

The hydroxyl ion-rich electrolyte then readily combines with Mg++ and Ca++ ions to form a precipitate which is thrown down on the cathode.

(5) $\quad Mg^{++} + 2(OH)^- \rightarrow Mg(OH)_2$
(6) $\quad Ca^{++} + 2(OH)^- \rightarrow Ca(OH)_2$ Another possible reaction is:

(7) $\quad Mg^{++} + 2e^- \rightarrow Mg^0$
(8) $\quad Mg^0 + 2H_2O \rightarrow Mg(OH)_2 + H_2$ and similarly for calcium:

(9) $\quad Ca^{++} + 2e^- \rightarrow Ca^0$
$\quad Ca^0 + 2H_2O \rightarrow Ca(OH)_2 + H_2$ These precipitates are further hardened into the familiar calcareous deposits by the dissolved $CO_2$ in the sea water:

(10) $\quad 4Mg(OH)_2 + 3CO_2 + H_2O \rightarrow$
$\quad\quad Mg(OH)_2 \cdot 3MgCO_3 \cdot 4H_2O$
(11) $\quad Ca(OH)_2 + CO_2 \rightarrow CaCO_3 + H_2O$ The anode reactions associated with insoluble anodes such as graphite or platinum in sea water are as follows:

(12) $\quad 2Cl^- \rightarrow Cl_2 + 2e^-$ or (13) $\quad Cl^- + 2OH^- \rightarrow ClO^- + H_2O + 2e^-$
(14) $\quad Cl_2 + H_2O \rightleftarrows (H^+ + Cl^-)HOCl$ From the foregoing examination of the factors responsible for the corrosion of the under water hull of a vessel, applicants concluded that specific materials are needed for use in cathodic protection systems. The particular properties sought will depend on the end use of the material. In general, materials are needed which are non-conducting, alkali resistant, oxy-chloride resistant, have low permeability to water transmission under a potential gradient, low water absorbitivity, are nonreactive to sea water, have high strength, are impact resistant and are readily formed into a variety of shapes. Plastic materials because of their versatility lend themselves admirably for components of cathodic protection systems.

Briefly, the elements of a cathodic protection system consist of an anode; a cathode; a current source and external circuit; and measuring instruments.

The anode for impressed current systems may be a platinum-clad silver or copper rod, or an integral platinum or platinum-clad disc or gauze, a graphite rod or slab, or other shapes of inert materials such as lead and, lead-alloys and high silicon iron alloys. The anode must be mounted in suitable holders which must be dielectric, oxy-chloride resistant, and rugged.

The cathode of a cathodic protection system is the structure under consideration; in the instant case a ship's hull. In order to insure adequate current distribution from the anode, shield materials are mounted on the hull in the vicinity of the anode. These materials must adhere to steel, have low permeability to electro-osmosis, have alkali resistance, be tough and flexible, and have good dielectric properties.

The current source and external circuit implies the use of chemically resistant cable sheaths and suitable cable attachment to the anode with appropriate seals.

The measuring instrument used for determining the cathodic potential of the structure is the reference electrode. This sensitive element must be housed in a dielectric, nonreactive, streamlined casing which is fitted with suitable cable seals.

The instant invention is particularly concerned with holders for attaching and supporting rectifier energized anodes on the hull of a ship; surface or submarine.

An object of this invention is to provide an improved anode holder for use in cathodic protection systems.

Another object of the invention is to provide a streamlined anode holder.

Another object of the invention is to provide an anode holder that is dielectric.

Another object of the invention is to provide an anode holder that is resistant to alkali reactions.

Another object of the invention is to provide an anode holder that is resistant to oxychloride reactions.

Another object of the invention is to provide an anode holder that is light in weight, low in cost and high in mechanical strength.

Another object of the invention is to provide an anode holder wherein all mounting hardware is insulated and isolated.

A further object of the invention is to provide an anode holder wherein a relatively fragile anode is protected against mechanical shock.

A further object of the invention is to provide an anode holder wherein all except a deliberately exposed surface of the anode is protected against electrochemical deterioration.

A further object of the invention is to provide an anode holder which assists in the distribution of current from the anode.

A further object of the invention is to provide an anode holder which provides relatively free and rapid circulation of an electrolyte between the anode and a cathode.

A further object of the invention is to provide an anode holder assembly incorporating a connecting cable for carrying an impressed current to the anode.

A further object of the invention is to provide an integral assembly of anode, holder and current-carrying cable.

In accordance with this invention, the anode holders can be made for either graphite and other material shapes or for platinum-clad rods, discs or gauze. Certain features of the novel holders are common to various anode shapes and materials and other features apply to specific anodes.

In general, the holder of the instant invention is constructed of a dielectric material, such as, a glass or nylon reinforced plastic which has been shown by test to be resistant to electrochemical reactions at the anode and cathode. Tests have shown that polyester resins resist oxy-chloride reactions occurring at the anode and epoxy resins resist alkali reactions occurring at the cathode. The holders can be readily molded to proper shape by casting in a mold or through a laminate lay-up process. The cloth or chopped reinforcing fiber content can be adjusted to achieve the requisite physical properties of high impact shock resistance. Where the holder lays against the hull, several coats (20 mils) of epoxy resin are applied on all holder surfaces touching or adjacent to the hull. The application of epoxy resin directly to the cured polyester forms an integral mass, chemically bonded. The nonmetallic plastic holder provides positive anode insulation. It is streamlined, is light in weight and low in cost. The holder is fastened by a welded stud arrangement on the hull. The nuts for the fastening studs are either recessed within the plastic so that they are covered over with an insulating putty or with plastic plugs, or if protruding from a flange on the holder, the nuts are covered with moulded plastic caps.

Particular features of the instant invention common to the graphite holders are:

a. The graphite is held securely in the holder by making it trapezoidal in cross section and roughening or scoring all edges in contact with the holder. The graphite is then bonded to the holder by setting it within a bed of liquid resin and allowed to cure. In one embodiment, a graphite anode is secured in a preformed holder by casting the resin around the void between the graphite. In another embodiment, a graphite anode is secured to the holder by a wet lay-up process. As will appear hereinafter, no holes are drilled through the graphite for securing purposes.

b. The connecting cable for carrying the impressed current is inserted well within the graphite and attached thereto with a suitable gripping device. The recess in the graphite is filled with an insulating mastic or resin prior to assembly within the holder. The cable and graphite in turn are positioned in the plastic holder and make into an integral assembly. The cable protrudes through the bottom surface of the anode and penetrates the hull through a suitable stuffing tube. Provisions are made where the stuffing tube may have its packing gland nut inboard or outboard. Where the packing gland nut is inboard, a recess under the base of the holder is provided to clear any welding projection of the stuffing tube. Where the gland nut is tightened on the outside of the hull, one end of the holder is fabricated with a hollow void to receive the slack cable after tightening the gland nut. The void is then filled with suitable material such as a mastic or polyester resin.

c. One specific feature for achieving lightness of weight and high strength with maximum streamlining is to use a hollow shell construction. The ends of the holder are filled with a light weight unicellular foam which is resistant to sea water, such as isocyanate or polyvinyl chloride copolymer. This cellular material also forms a cushion for the graphite anode when subjected to mechanical shock.

d. In the type of holders hereinafter described for graphite, the height of the graphite can safely be reduced an appreciable amount, as the bonded plastic holder will provide the required mechanical strength. This lower silhouette results in more efficient streamlining.

e. Another singular feature is the protruding of the top surface of the graphite above the top edge of the holder by ¼ inch or so. This allows for a small amount of electrochemical deterioration per year without seriously weakening or roughening the anode (⅛ inch depth loss at 15 amperes per year). Essentially, 3-5 years' service life can be realized without compromising greatly on the built-in design features.

Particular features of the instant invention common to holders for platinum-clad anodes are:

a. The platinum-clad anode rod is supported in its holder by means of suitable plastic polyester or rigid polyvinyl chloride spacers. The spacers are snug fitted on the rod prior to assembly and position the anode axially in its holder.

b. The holder itself is symmetrical about its axis and is generally fabricated by a wet lay-up process. It can also be made in one piece. Two angle sections are bolted together on a web section with plastic nuts and bolts, such as, rigid polyvinyl chloride. A wide flange particular to this holder serves as a partial dielectric shield for assisting current distribution from the anode. A cylindrical section of the holder is recessed at intervals to receive the spacers supporting the anode rod. The spacers may be cemented in place for additional strength. The cylindrical web section is scalloped between spacers to allow for maximum sea water path from anode to hull. The holder and spacers are drilled for free flooding and rapid circulation of sea water around the anode.

c. The platinum-clad anode rod has two features in connection with this type holder. The thimble end of the rod, otherwise exposed to the water, is covered with a polyester sleeve to doubly insure a waterproof joint between thimble and cladding on the anode rod. Further, a sharp bend required of the ¼ inch diameter rod where the anode enters the hull is clad with extra thickness platinum so that the stretching of the outer fibers during the bend will not result in a weakness in the cladding integrity.

In another embodiment of the invention, the holder for a platinum-clad, rod anode is constructed of steel with a ceramic coating, such as porcelain enamel, on all exposed surfaces and wherein the anode is supported in the holder by plurality of tetrafluoroethylene, "Teflon," discs.

In still another embodiment, a disc-like, platinum-clad anode of foil thickness is supported on the hull by a polyester glass reinforced molded holder, with the perimeter of the disc embedded in the plastic. In this embodiment the disc may be a foil, a gauze or a mesh.

Other objects and many of the attendant advantages of this invention will be readily appreciated as the same becomes better understood by reference to the following detailed description when considered in connection with the accompanying drawings in which like reference numerals designate like parts throughout the several views thereof, and wherein:

Fig. 26 is an enlarged perspective of one of a plurality of anode-holding discs shown in Figs. 21–24;

Figure 1:
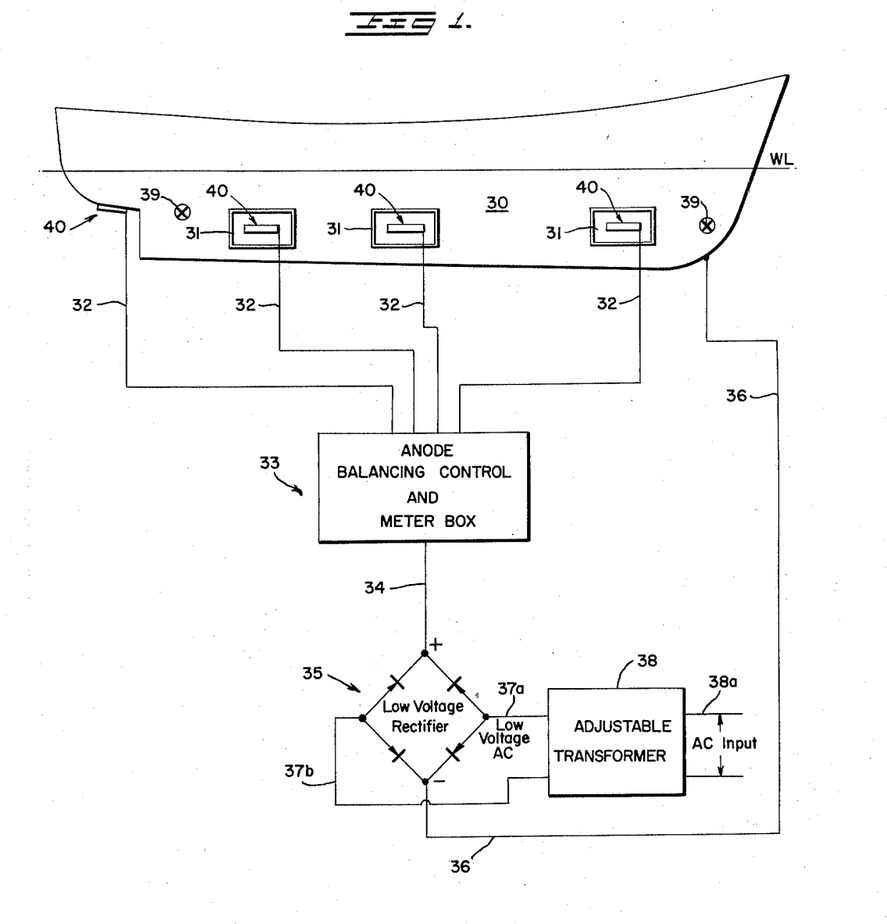
Fig. 1 shows a schematic wiring diagram for an impressed current cathodic protection system in accordance with this invention.

Referring first to Fig. 1, which illustrates a cathodic protection system wherein an impressed current is supplied by rectifier energized anodes, the numeral 30 designates the hull of a surface vessel protected by a plurality of anodes 40 spaced around the sides and stern thereof. As pointed out in detail hereinafter, each of the anodes is shielded from the hull by a dielectric shield or blanket 31. Each of the anodes is connected by a conductor 32 to an anode balancing control and meter box 33, which purpose is for measuring current output of each anode and for balancing differences in line resistance. Control 33 is connected by a conductor 34 to the positive side of a low voltage rectifier 35, while the negative side of the rectifier is grounded to the hull of the vessel by a conductor 36, thereby making the hull the cathode of the low voltage circuit. A pair of conductors 37a and 37b connect opposite sides of the rectifier to the low voltage A.C. output of electrical energy from an adjustable transformer 38 which is fed by an A.C. input 38a. Reference electrodes 39 are suitably mounted on the hull at least twenty-five feet from the nearest anode and are connected to a suitable potentiometer, not shown, for determining the polarization of the hull. Based on readings taken by the reference electrodes, adjustment can be made in the transformer 38 to change the current output to the anodes to correspond to the proper value. Reference electrodes (Ag—AgCl) readings below —.80 volt require an increase in the anode current, and readings above —.80 volt require a decrease in the anode current. The electric circuits, illustrated in Fig. 1, are not per se a part of this invention and therefore need not be described in further detail. It being sufficient to state that by these circuits a controlled low voltage current flows from the rectifier to the several anodes and from these through the sea water to the hull and back to the rectifier.

Figure 4:
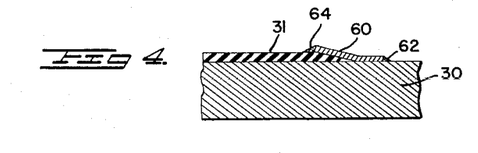
Fig. 4 is an enlarged sectional view showing in detail a manner of attaching a dielectric shield to the hull of a vessel.
Figure 5:
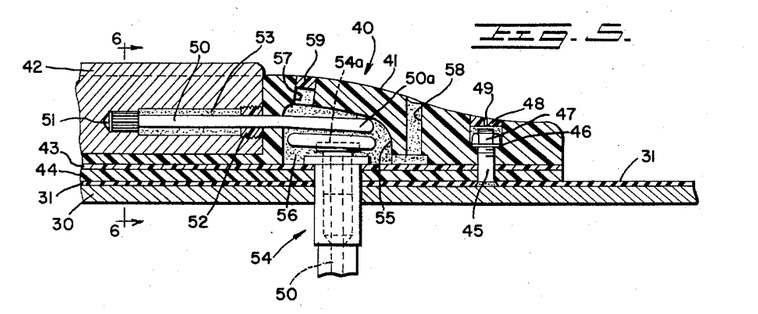
Fig. 5 is an enlarged detail section of the holder of Figs. 2 and 3, showing an arrangement wherein the gland nut is tightened from the outside of the hull.
Figure 6:
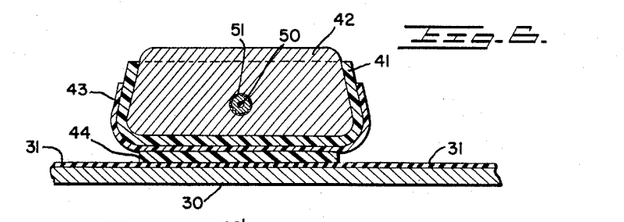
Fig. 6 is an enlarged transverse section taken on line 6—6 of Fig. 5.

Referring now to Figs. 2 to 8, in accordance with this invention a first embodiment of the anode, indicated generally by reference numeral 40, includes a holder 41 made of polyester resin plastic reinforced with glass fiber. Within the holder, and bonded directly thereto is a graphite anode 42. As shown in Fig. 6, the anode is trapezoidal in transverse section corresponding to the shape of the holder, and to insure proper adhesion of the anode to the holder all surfaces of the anode, except the exposed upper surface, are roughened prior to assembly with the holder. The holder, with the graphite anode positioned therein can be readily molded to the shape shown by casting in a mold or through a laminate lay-up process. The external, or otherwise exposed surface of the holder is coated with a substantial coating 43 (Fig. 6) of epoxy resin.

Between the holder and the hull 30 of the vessel to which the holder is attached is a thick rubber pad 44 and the dielectric shield 31. The rubber pad, which is of substantially the same horizontal contour as that of the holder, insures proper fit of the holder over minor irregularities in the hull and provides a measure of shock and vibration protection. The dielectric shield 31 is formed of sheet neoprene, and as shown in Fig. 1, extends appreciably beyond the confines of the anode.

The holder is attached to the hull 30 of the vessel by a plurality of studs 45, each having a standard washer 46 and a nut 47. The studs are made of corrosion resistant metal and are welded to the hull. Each of the nuts 47 fits within a recess in the holder, which recess, after the nut is tightened, is filled with epoxy resin, after which a plastic plug 48 is driven into the recess. The plastic plugs, which are made of polyester resin with glass fiber reinforcement, are coated with a polyester cement prior to being driven into the recesses and are each provided with a vent 49, which vent is sealed with a polyester resin after the plug is driven in place. Also, after the plugs are driven into place, excess material at the top of each plug is shaved off and the top surface of the plug is contoured to blend with that of the holder, as shown in Figs. 3 and 5.

Figure 2:
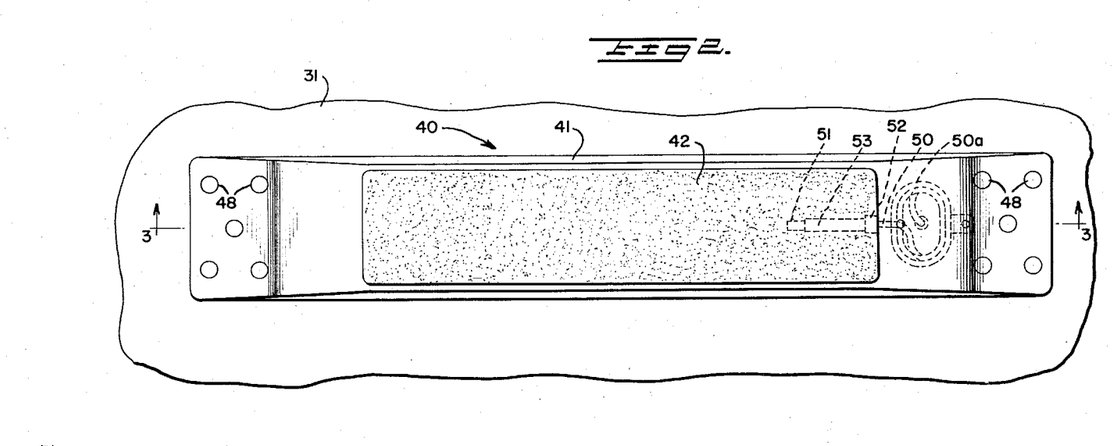
Fig. 2 is a plan view of a graphite anode holder in accordance with a first embodiment of the invention.
Figure 3:
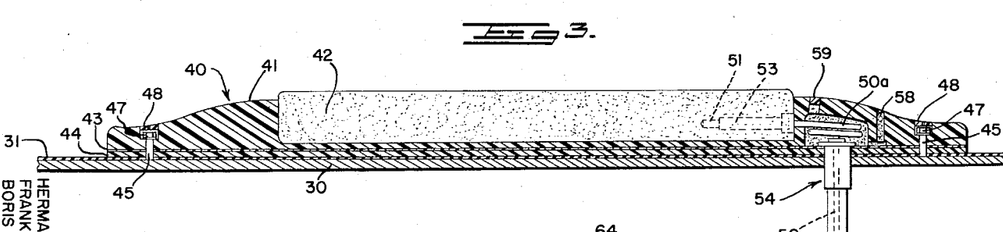
Fig. 3 is a longitudinal section taken on line 3—3 of Fig. 2.
Figure 8:
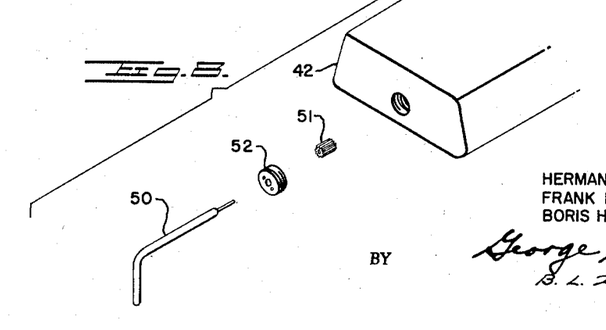
Fig. 8 is an exploded perspective showing a manner of anchoring an electrical cable to a graphite anode.

Prior to casting or laying-up of the plastic holder around the anode, the graphite anode is bored to form a longitudinal recess or cavity in the right hand end thereof, as viewed in Figs. 2, 3 and 5, into which recess is placed a current-carrying cable 50. As shown in Fig. 8, the end of the current-carrying wire is bare and is inserted into and soldered to a terminal plug 51, which plug is made of a good electrical conducting metal and is knurled on its outer surface for good contact with the graphite anode 42 when forced into the recess under pressure. A plastic, gland nut 52 is screw threaded into the graphite anode. Prior to the threading of the plug 52 into the anode, the void between the cable and the inner surface of the anode is filled with a petroleum asphalt 53 (Fig. 5). To insure proper adhesion of the sealing compound 53, and plastic resin of the holder 41, to the cable, the cable is roughened prior to insertion into the recess. Thus, the current-carrying cable is properly secured and sealed to the graphite anode and holder assembly.

As shown in Figs. 3 and 5, cable 50 protrudes through the bottom surface of the anode holder and penetrates the hull of the vessel through a suitable stuffing tube 54. The stuffing tube is not per se a part of this invention and therefore need not be described in detail. In the embodiment shown in Figs. 3 and 5, the packing gland 54a of the stuffing tube 54 is tightened on the outside of the hull, and to facilitate such tightening, the current-carrying cable is provided with a slack, coil portion 50a located within a recess 55 in the right hand end of the anode holder. After the packing gland is properly tightened and the anode holder, with the anode and current-carrying cable attached thereto, secured to the hull by the studs 45 and nuts 47, the void remaining in the recess 55 is filled with a polysulphide rubber compound 56. This compound may be pressure-injected into the recess through an opening 57 in the holder, and to insure complete filling of the void, the recess is vented to the atmosphere by a vent passage 58. After this filling of the void with the rubber compound is completed, as indicated by the extrusion of surplus compound through the vent 58, the filling opening is closed and sealed by a plastic plug 59 driven thereunto. The surplus material of plug 59 and excess compound at the exit of vent passage 58 are then shaved off to blend with the streamline contour of the anode holder.

Figure 7:
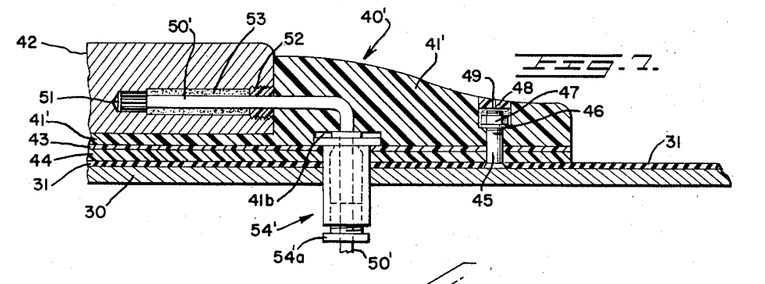
Fig. 7 is an enlarged detail section similar to Fig. 5, showing a modified arrangement wherein the gland nut is tightened from the inside of the hull.

In Fig. 7, there is shown an anode holder 41' adapted for use with an installation wherein the packing gland nut 54'a of a stuffing tube 54' is tightened from inboard, and as shown, the right hand end of the holder is solid except for slight recess 41b which receives the outboard end of the stuffing tube. With this arrangement there is no need for a slack coil in the current-carrying cable. Otherwise, the anode assembly, including the plastic holder, graphite anode and current-carrying cable, is substantially the same in Fig. 7, as that shown in Figs. 2–6 and 8.

In Fig. 4, there is shown a method of securing the dielectric shields 31 (Fig. 1) to the hull of the vessel prior to the installation of the anodes. Each of the shields is made of sheet neoprene of predetermined dimension and is bonded to the hull by a cold bonding agent, such as neoprene based cement. Then the marginal edges of the shield are secured by a frame 60 of steel strip. The outer edges of the frame are welded to the hull, as at 62, and the inner edges are sealed by a neoprene caulking compound 64.

In practicing the invention, with an anode assembly measuring 1' x 5', a neoprene dielectric shield measuring 6' x 10' x ⅛" thick gives excellent results in forcing anode currents out from the anode into surrounding sea water where resistance paths are more nearly uniform, resulting in substantially uniform distribution of anode currents over the hull of the vessel. This effectively reduces high current concentration near the anode with its deleterious effects on existing paint coatings. In practice, the effectiveness of the shield may be enhanced by applying a heavy coat of vinyl paint 2 to 3 feet out from the edges of the neoprene sheet.

In Figs. 9–12, there is shown a second embodiment of this invention wherein the anode assembly, indicated generally by reference numeral 70, includes a plastic anode holder 71 formed around a graphite anode 72. The holder 71, which is preformed of a glass-reinforced polyester resin, may be cast or pressed into shape and between the holder and the graphite anode is a relatively thick coating of a glass-reinforced polyester resin 73. The holder is coated on the outside with a substantial coating of epoxy resin 74. Between the holder and hull 30 of the vessel is a thick rubber pad 75 and the neoprene dielectric shield 31. The dielectric shield is of substantially the same dimensions and is secured to the hull in the manner heretofore described with reference to Fig. 4.

The holder 71 is formed with a continuous, elliptical-shaped flange 71a around its periphery which is drilled at spaced intervals to receive a like number of studs 76, which studs are made of corrosion resistant metal and are each provided with a standard washer 77 and a nut 78 for securing the holder to the hull 30 of the vessel. The studs, washers and nuts are enclosed within an elliptical ring 79 of the same horizontal contour as that of the flange 71a of holder 71. Ring 79, which is formed of a glass reinforced epoxy laminate, is cemented to the flange of the holder by a suitable, waterproof adhesive, or attached mechanically.

Figure 9:
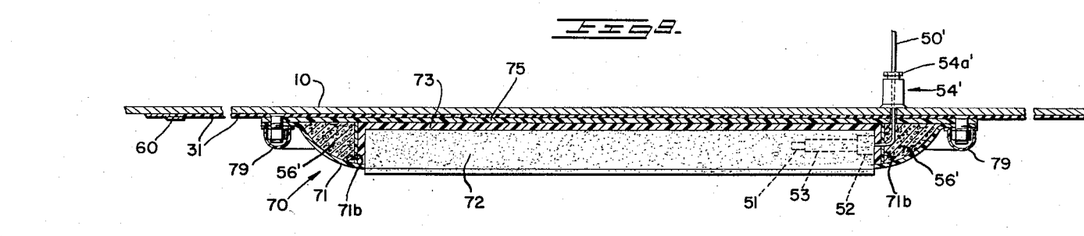
Fig. 9 is a longitudinal section through a graphite anode holder in accordance with a second embodiment of the invention and taken on line 9—9 of Fig. 10.
Figure 10:
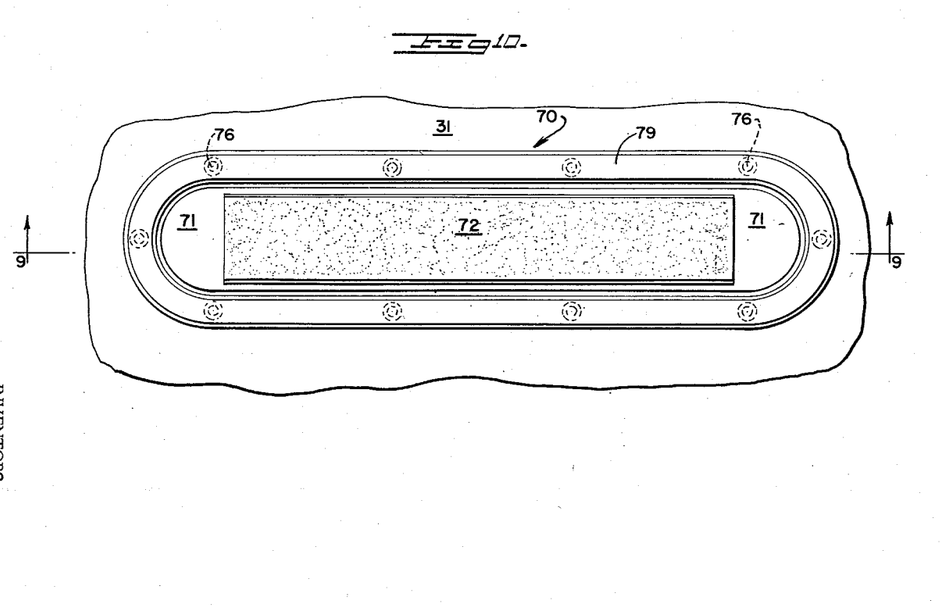
Fig. 10 is a plan view of the anode holder shown in Fig. 9.
Figure 11:
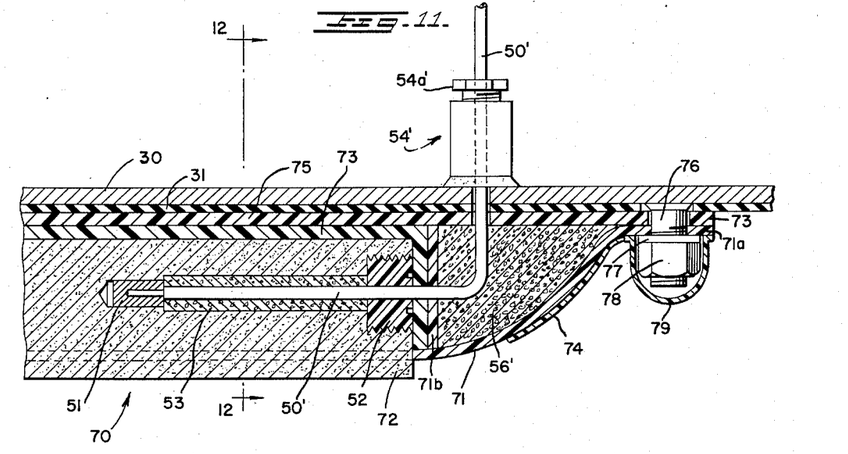
Fig. 11 is an enlarged detail section of the right hand end of the holder shown in Fig. 9.
Figure 12:
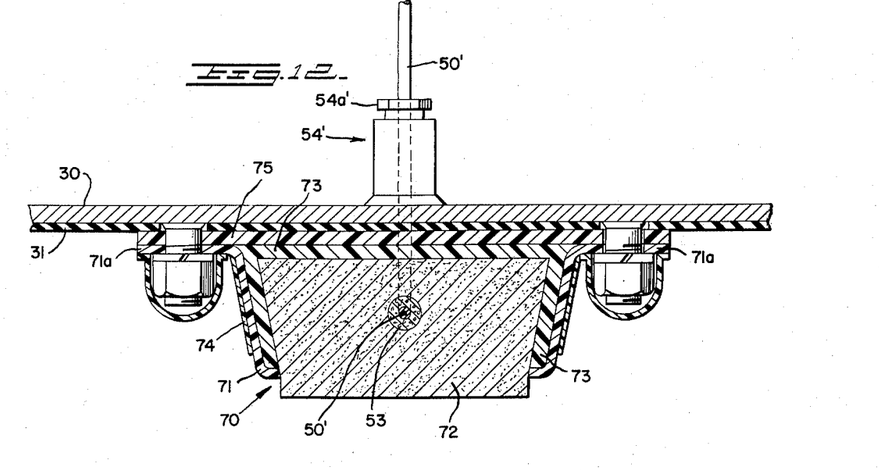
Fig. 12 is an enlarged transverse section taken on line 12—12 of Fig. 11.

Prior to assembling the graphite anode 72 within the plastic holder 71 by casting glass-reinforced plastic resin material 73 around the anode, the graphite anode is bored to form a longitudinal recess or cavity in the right hand end thereof as viewed in Figs. 9 and 11, into which is placed a current-carrying cable 50'. The current-carrying cable and the manner of attaching such cable to the graphite anode 72 of Figs. 9–12 is substantially the same as that described above with reference to the embodiment shown in Figs. 2–8. Therefore, like parts are designated by like reference numerals and further detailed description of the components of the cable is unnecessary. It is to be noted that the gland nut of stuffing tube 54' of Fig. 11 is accessible for tightening from inside the hull as in Fig. 7. However, should it be desirable to manipulate the stuffing tube from the outside of the hull, the current-carrying cable would include a slack coil as shown in Fig. 5. At each end of holder 71, Figs. 9 and 11, there is a straight wall portion 71b and the space between this wall and the accurate end walls of the holder is filled with a unicellular plastic foam 56'.

Thus it is seen, in each of the embodiments of the invention shown in Figs. 2–8 and in Figs. 9–12, there is disclosed a plastic holder which provides positive insulation for a graphite anode and wherein the anode is protected against electrochemical deterioration and ambient sea water except at the deliberately-exposed outer surface thereof, which holder is streamlined, is light in weight and low in cost, and wherein the current-carrying cable and all metal hardware are water proofed and insulated from ambient sea water.

In Figs. 13–20, there is shown a third embodiment of the invention wherein an anode assembly, indicated generally by reference numeral 80, includes a holder 81 for supporting an inert, rod anode 82. The holder is formed as a built-up, inverted T-shaped assembly of open hearth iron plates covered with a ceramic coating, such as, an acid resistant dielectric porcelain enamel. The holder 81 can also be constructed from an integral rolled T-bar metal section or a built-up plastic section. The anode is formed of a platinum-clad silver rod. Between the base of the holder and the hull 30 of the vessel is a thick rubber pad 83 (Figs. 15–17) and a dielectric shield 84. The rubber pad, which is of substantially the same horizontal contour as the base of the holder, insures proper fit of the holder over minor irregularities in the hull and it provides a measure of shock and vibration protection to the holder. The dielectric shield is formed of sheet neoprene and it performs the same functions as recited heretofore with reference to the shield 31 of the first two embodiments of the invention.

Figures 15, 16:
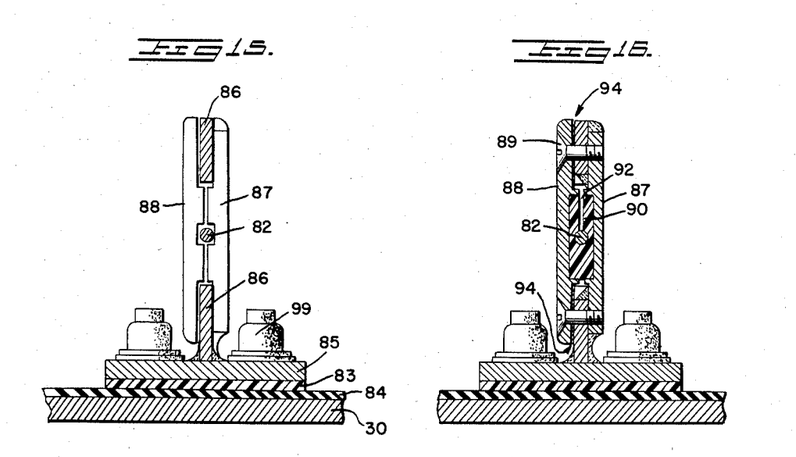
Figs. 15, 16 and 17 are enlarged transverse sections taken on lines 15—15, 16—16 and 17—17, respectively, of Fig. 13.

With reference to Figs. 15–18, the holder includes a base plate 85 to which is welded an upright plate 86. A plurality of clamp plates 87 are spaced along the upright plate (Fig. 13) and welded thereto, as shown in Fig. 16. A plurality of companion clamp plates 88 are attached to respective clamp plates 87 by screws 89. So that the heads of the screws are flush with the outer vertical surface of plates 88, these plates are countersunk to receive the heads of the screws, while the shank of the screws pass through holes in the upright plate 86 and are screw threaded into tapped holes in clamp plates 87.

Figure 13:
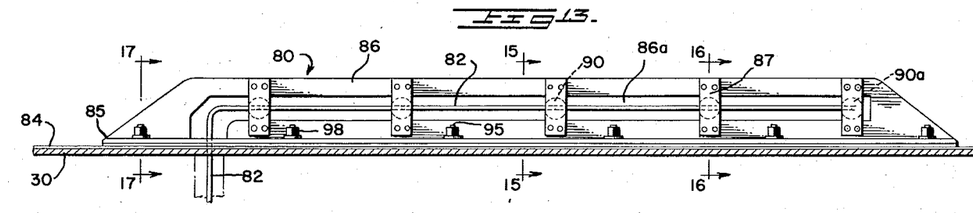
Fig. 13 is an elevation of a third embodiment of the invention, showing a holder for a platinum-clad rod anode.
Figure 14:
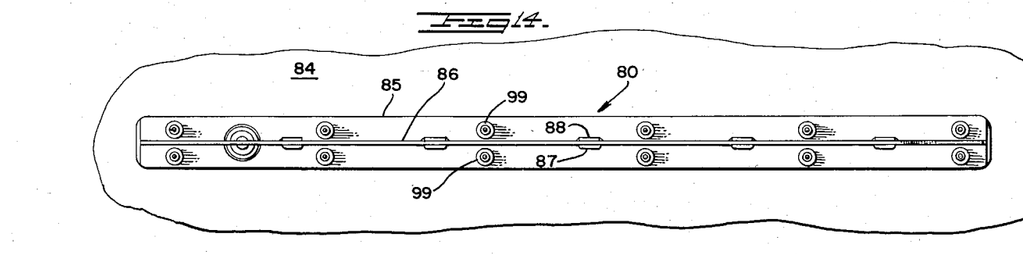
Fig. 14 is a plan view of the holder shown in Fig. 13.
Figure 19:
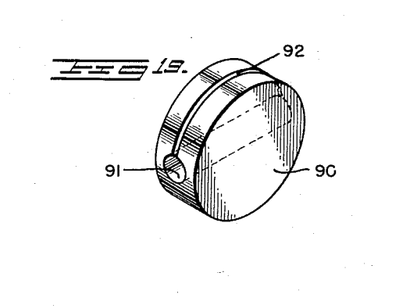
Fig. 19 is an enlarged perspective of one of a plurality of anode-supporting discs shown in broken lines in Fig. 13.
Figure 20:
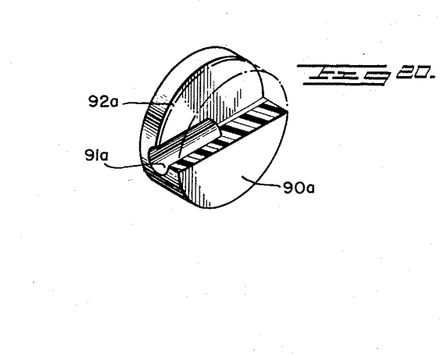
Fig. 20 is an enlarged perspective, partly in section, of a disc for supporting the extreme right hand end of the anode as viewed in Fig. 13.

Each of the clamp plates of the two sets is provided with offset portions so as to fit upon the upright plate and with a circular recess to receive and clamp there between an anode-holding disc 90. The discs 90 are formed of insulating plastic, such as Teflon, with right hand end disc 90a (Fig. 13) formed as shown in Fig. 20, with a radial bore or well 91a extending part way thereinto to receive the right hand end of the rod anode, and with a saw cut 92a extending into the disc from the upper outer surface thereof to the longitudinal axis of the well. Each of the discs 90 is formed as shown in Fig. 19 with a diametric bore 91 extending therethrough and with a saw cut 92 extending through one half of the disc to meet the bore 91. As shown in Fig. 13, the upright plate 86 of the holder is formed with an elongated slot or opening 86a for the reception of the rod anode and its supporting discs 90 and 90a. The slot 86a is closed at the right end (Fig. 13) of the holder, and at its left end, the slot extends downward for passage of the anode through the hull of the vessel for connection with a low voltage source of current, such as shown in Fig. 1.

In fabricating the inverted T-shaped holder, the upright plate 86, with the slot 86a formed therein and with the ends beveled for streamlining as shown in Fig. 13, is welded along its length to the base plate 85, then the clamp plates 87 are welded to the upright plate. The welds are then ground smooth in the manner shown in Fig. 16, and the sub-assembly of base plate, upright and the one set of clamp plates is coated first with a ground coat of porcelain enamel and then with a second or finish coat of acid resistant, electrical insulating porcelain enamel. The companion clamp plates 88 are likewise coated with two coats of porcelain enamel. Then with the discs 90 and 90a positioned on the rod anode, the anode is located in the slot 86a, the discs are located within the recesses of the clamp members and the screws 89 are applied to the clamp members. Prior to the application of the screws to the clamp members, a pair of plastic Teflon sealing gaskets 94 is located between the mating surfaces of each of the clamps 88 with the upright plate 86 as shown in Fig. 16. After the gaskets are in place and the screws tightened, the exposed ends of the screws are covered with a plastic coating of waterproof, dielectric material. The anode assembly is now ready to be attached to the hull of the vessel.

Figure 17:
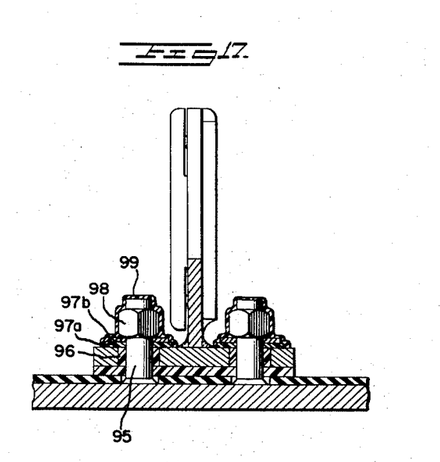
Figure 18:
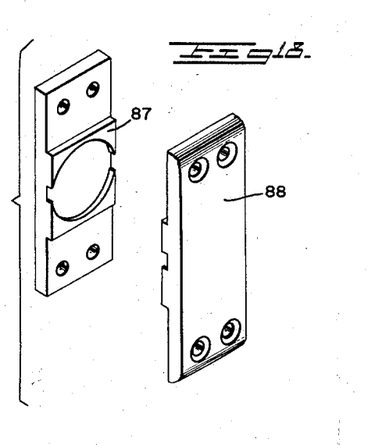
Fig. 18 is an enlarged exploded perspective of a clamp shown in Figs. 13–17.

The anode assembly is attached to the hull by a plurality of corrosion resilient studs 95 welded in predetermined spaced relation along the hull. As shown in Fig. 17, the base plate 85 of the holder assembly is formed with a plurality of openings, spaced in accordance with the spacing of the studs 95. With the base plate positioned on the studs, a ferrule 96, formed of epoxy glass laminate or other suitable plastic, is fitted between the stud and the base plate, after which a plastic washer 97a, a standard metal washer 97b and a stop nut 98 are each applied to each of the studs. After the stop nuts have been properly tightened, the fastening assemblies are each capped with a plastic bonnet 99, which bonnet is cemented to the assembly by a waterproof dielectric adhesive. For clarity of illustration, the bonnets have been omitted in Fig. 13. Thus, the entire anode assembly with the exception of the platinum-clad anode, is waterproofed, is electrically shielded and insulated from the hull and ambient sea water, and the platinum-clad anode is electrically insulated from the entire holder and electrically shielded from the immediately surrounding hull, with low voltage currents passing only from the platinum-clad anode through ambient sea water to the hull beyond the confines of the dielectric shield 84.

Figs. 21-26 illustrate a fourth embodiment of the invention. Here, the anode assembly, indicated generally by reference numeral 100, includes a holder 101, made of polyester resin reinforced with glass fiber, and an inert, rod anode 102 formed of a platinum-clad silver rod and supported by the holder. Between the holder and the hull 30 of the vessel is a thick rubber pad 103 and a neoprene dielectric shield 104. The rubber pad and the dielectric shield each performs the same functions as in the other embodiments of the invention described heretofore.

The holder 101 includes two substantially identical members, each including a horizontal or base portion 101a, a web or vertical portion 101b and an arcuate or semicylindrical portion 101c. At each end and at a number of intermediate points, depending upon the length of the holder, the web portions of the holder are drilled and are clamped together (Fig. 24) by a bolt, lockwasher and nut assembly indicated generally by reference numeral 106. Each of the elements of the bolt, lockwasher and nut assemblies is formed by vinyl chloride or other suitable dielectric, corrosion resistant material.

Prior to clamping the web portions together, as just described, a plurality of spacers 107, with the rod anode mounted thereon, are located between the semicylindrical portions of the holder. The spacers, which are formed of polyester laminate and cylindrical in shape, are drilled with a central opening 107a for passage of the rod anode therethrough and with additional openings 107b for passage of sea water as described hereinafter. One of the spacers is located directly above each of bolt assemblies 106 within mating recesses in the cylindrical portions of the holder, as shown in broken lines in Fig. 24. Between the spacers 107, the upper or cylindrical portions 101c of the holder is scalloped in both a horizontal (Fig. 21) and a vertical (Fig. 22) direction, and, as shown, there is provided a series of spaced holes 101d along the length of each of these members. The scallops and holes in the holder and the holes in the spacers eliminate excess material in the way of the anode which reduces water resistance in the way of the anode thereby increasing current output at the anode.

Figure 25:
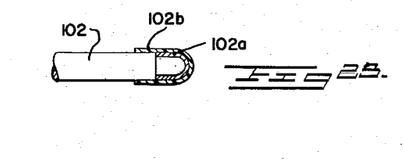
Fig. 25 is an enlarged detail, partly in section, showing an insulating cap for an otherwise free end of the platinum-clad anode.

As shown in Fig. 25, the outer end, right hand end (Fig. 22), of the platinum-clad anode is swaged and a silver-soldered, platinum thimble 102a is sweated thereon. Then a coating or cap 102b of polyester resin is placed over this end of the anode. The inner end of the anode, not shown, is likewise provided with a platinum thimble, without the plastic cap, for connection with a female electrical fitting attached to a current-carrying cable, not shown but similar to that shown in Fig. 28, as described hereinafter.

Figure 22:
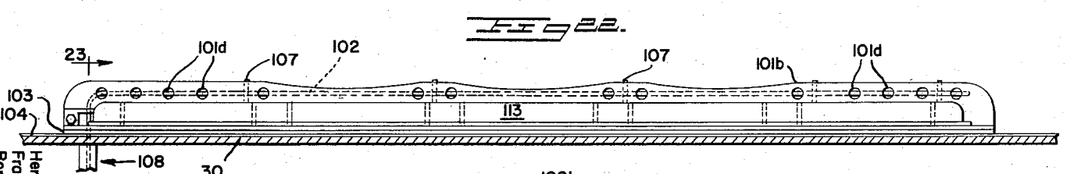
Fig. 22 is an elevational view, partly in section, of the anode holder of Fig. 21.
Figure 23:
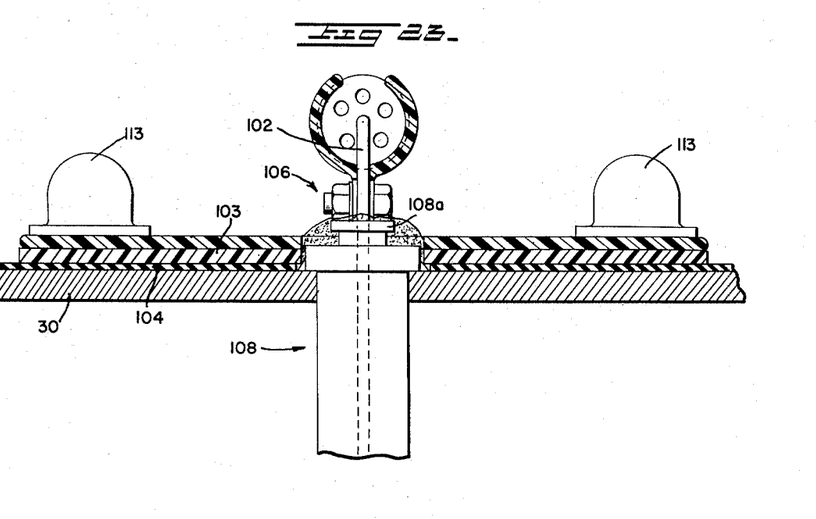
Fig. 23 is an enlarged transverse section taken on line 23—23 of Fig. 22.
Figure 24:
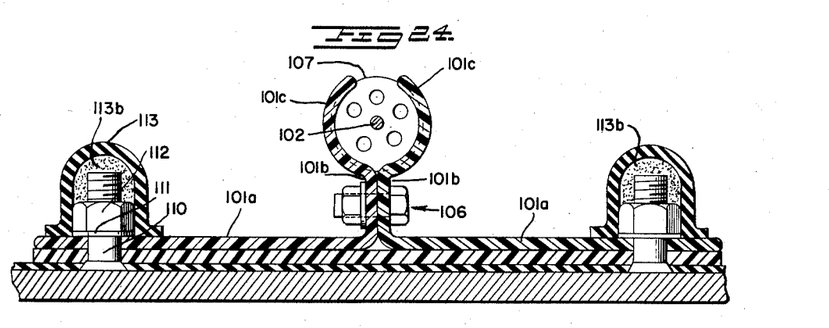
Fig. 24 is an enlarged transverse section taken on line 24—24 of Fig. 21.

At the left end, as viewed in Fig. 22, and as shown in Fig. 23, the platinum-clad anode penetrates the hull of the vessel through a stuffing tube 108 welded to the hull. The gland nut 108a of the stuffing tube is accessible for outboard adjustment. So as to accommodate the outboard end of the stuffing tube and packing gland, the base portion 101a and web portion 101b of the holder, the rubber pad 103 and the dielectric shield 104 are provided with aligned openings, as shown in Fig. 23. The stuffing tube per se is not a part of the instant invention and therefore need not be described in detail.

Figure 21:
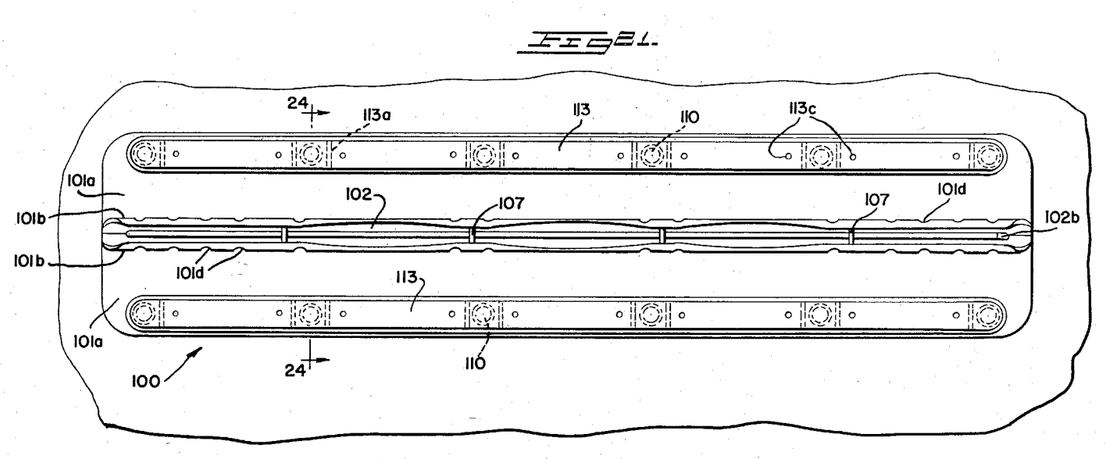
Fig. 21 is a plan view of a fourth embodiment of the invention, showing another form of holder for a platinum-clad rod anode.

The assembled holder 101 with the rod anode 102 mounted thereon is attached to the hull by a plurality of corrosion resistant studs 110 welded to the hull, each of which studs is provided with a standard lockwasher 111 and a nut 112. The mounting hardware is then enclosed by a pair of molded housings 113 formed of epoxy glass laminate and cemented to the base of the holder by a suitable waterproof, dielectric material. Each of the housings 113 is provided with a plurality of transverse partitions 113a, one at each side of the nuts 112, which partitions confine an insulating mastic 113b surrounding each nut. To prevent excess water pressure from acting on the housing 113, the housing is provided with a plurality of free-flooding holes 113c in the top surface thereof.

During fabrication of the assembly, all machined and drilled surfaces of the holder are coated with polyester resin. After installation of the assembly on the hull, the space (Fig. 23) between the stuffing tube and the dielectric shield, the rubber pad and the base of the holder is filled with epoxy resin. Also any otherwise exposed surface of the stuffing tube and gland nut are painted with a coat of epoxy resin. In this manner, no metal parts are exposed except the platinum anode, which anode is insulated and shielded from stray currents as pointed out heretofore.

Figure 27:
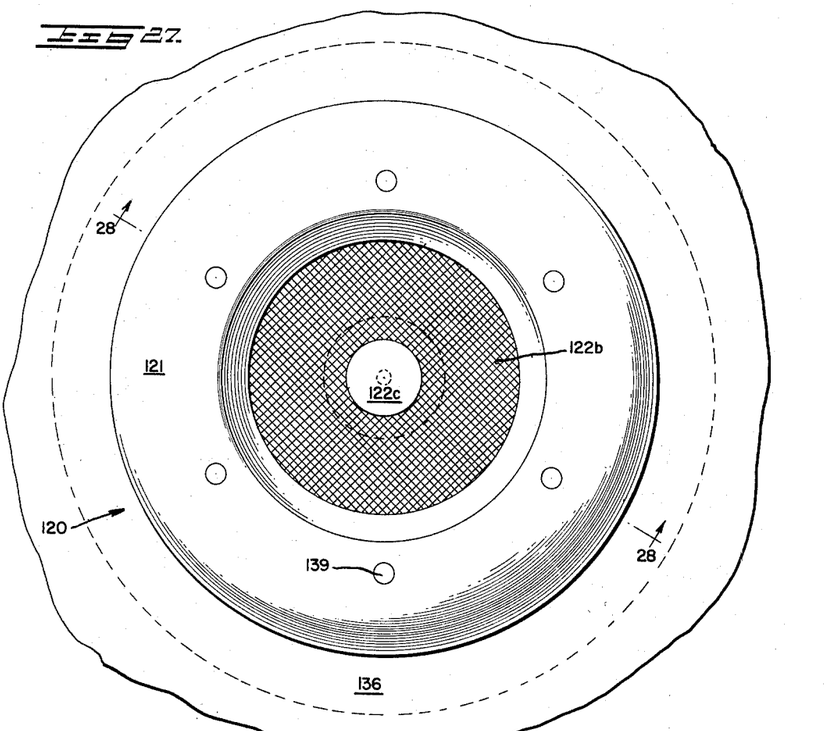
Fig. 27 is an enlarged plan view of a fifth embodiment of the invention, showing a holder for a platinum-clad, disc anode.
Figure 28:
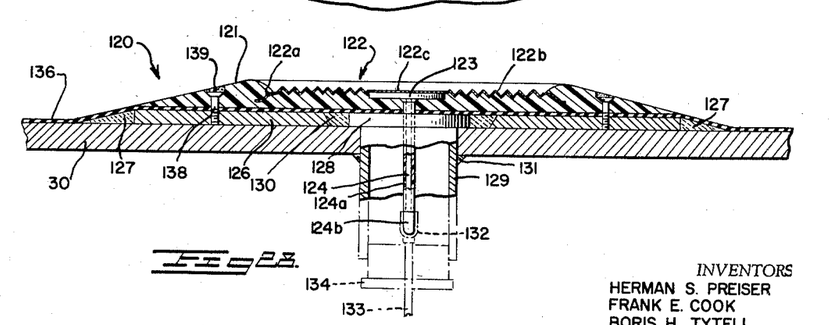
Fig. 28 is a transverse section taken on line 28—28 of Fig. 27.

In Figs. 27 and 28 then is shown a fifth embodiment of the invention wherein an anode assembly, indicated generally by reference numeral 120, includes a plastic holder 121 and an inert, platinum foil anode 122. The anode is in the form of a disc with the perimeter thereof bent inward, forming a circular flange 122a that is embedded in the holder. At the center, the anode is formed with a smooth circular portion 122c, to the back surface of which is welded a platinum-clad of other precious metal backing piece 123. Between the center and flange portions, the disc is indented to form a grid-like structure indicated in exaggerated form at 122b. This indenting or scoring of the anode surface provides anchorage to the plastic holder and it lowers surface resistance because of easy release of gaseous products. Prior to embedding the anode 122 in the plastic holder, a platinum-clad prong 124 is welded to the backing piece 123. The prong 124 is coated with a liquid polyester resin over which is placed a glass reinforced polyester sleeve 124a. The sleeve 124a covers the entire length of the prong except for an exposed tip 124b, which tip is of substantially the same outside diameter as that of the polyester sleeve.

With the anode shaped and assembled in the manner described the disc is then embedded in the plastic holder by casting around the disc, leaving only the outer surface of the smooth center and indented portions exposed. Thus an assembly of holder and anode is formed that is circular in plan, streamlined and of wafer thickness. The indented or roughened disc, which is of foil thickness may be replaced by platinum gauze or mesh.

A circular sole plate 126, of substantially the same diameter as that of the plastic holder is welded at its periphery to the hull 30 by a circular weld 127. As shown in section in Fig. 28, the weld 127 is ground smooth to the streamline contour of the sloping surface of the holder. The sole plate is provided with a beveled circular opening in its center for the reception of a collar 128 of a stuffing tube 129. Collar 128 is of the same thickness as the sole plate and the space between the periphery of the collar and the beveled surface of the sole plate is filled with a weld 130, the outer surface of which weld is ground smooth to the level of the sole plate and collar.

The stuffing tube, shown schematically in Fig. 28, projects through an opening in the hull to the interior thereof and is welded thereto as at 131. A female connector 132 is located within the stuffing tube in position to receive the exposed, platinum-clad tip 124b of prong 124, and the connector forms the terminal of a current-carrying cable 133 that passes through a gland nut 134, screw threaded into the stuffing tube. The current-carrying cable is connected to a suitable source of low-voltage current, not shown, but which may be the same as that shown in Fig. 1.

Prior to attaching the anode assembly to the hull of the vessel, a neoprene shield 136 is applied to the hull in the manner described above with reference to Fig. 4. Then the anode assembly is attached to the hull by means of a plurality of screws 138 that are threaded into tapped, spaced openings in the sole plate. After the screws have been driven home, each of the heads thereof is covered by a plastic material 139 streamlined to the contour of the holder. As shown in Fig. 28, the contour of the exposed surface of the holder is such as to prevent damage to the anode by dragging ropes or the like while still not interfering with the free passage of sea water into contact with the anode. As with the other embodiments of the invention, the only metal exposed to sea water is the platinum anode. If desired, the attaching screws 138 may be replaced by studs and nuts and a rubber pad may be inserted between the anode holder and the hull, as disclosed in the other embodiments of the invention.

It should be understood, of course, that the foregoing disclosure relates to only preferred embodiments of the invention and, although the invention has been illustrated and described in connection with particular details of construction and particular materials specific to one or more of the several embodiments of the invention, the details of construction and the particular materials may be modified and/or interchanged without departing from the spirit and scope of the invention as set forth in the appended claims.

What is claimed is:

1. An anode assembly for cathodic protection of a metal structure comprising an inert anode trapezoidal in cross-section and having plane and parallel top and bottom surfaces and inclined side walls converging from the bottom to the top surface, a holder for the anode, said holder being formed of dielectric, anticorrosive plastic resin having interior side walls and a bottom forming a cavity therein of substantially the same cross-sectional shape as that of the anode, said anode being fitted within the cavity of the holder and having the bottom and side walls of the trapezoidal anode in contact with and firmly bonded to the bottom and side walls of the cavity leaving substantially only the top plane surface of the anode exposed, and means for insulatedly supporting the bottom of the holder on the metal structure.

2. An anode assembly as set forth in claim 1 wherein the anode is formed of graphite and wherein the anode holder includes glass reinforced resin as a means for protecting the anode against mechanical shock.

3. An anode assembly for use in impressed current cathodic protection systems for the underwater protection of the hulls of ships comprising, an inert anode, said anode being formed of a slab of graphite substantially trapezoidal in cross-section, a holder for the anode, said holder including a prefabricated casting of reinforced polyester resin having a cavity therein of substantially the same contour as that of the graphite anode with the anode fitted within such cavity and firmly bonded within the holder with only an upper surface of the trapezoidal anode exposed, and said holder having a base portion thereof provided with a plurality of predetermined spaced openings therein, attaching means for mounting the holder on the hull of a ship, said attaching means including a plurality of studs secured to the hull in the same predetermined spaced relation as the openings in the base portion of the holder for receiving the holder, a nut for each of the studs and a polyester plastic housing attached to the holder for enclosing the attaching studs and nuts, a dielectric shield secured to the hull between the base of the holder and the surface of the hull and extending on the surface of the hull an appreciable distance beyond the horizontal confines of the holder, and means for securing the dielectric shield to the hull.

References Cited in the file of this patent

UNITED STATES PATENTS

| | | |
|---|---|---|
| 2,025,243 | Jackson et al. | Dec. 24, 1935 |
| 2,776,940 | Oliver | Jan. 8, 1957 |
| 2,776,941 | Wagner | Jan. 8, 1957 |

FOREIGN PATENTS

| | | |
|---|---|---|
| 614,799 | Great Britain | Dec. 22, 1948 |